(No Model.)

J. R. PIKE.
SINK TRAP.

No. 354,930. Patented Dec. 28, 1886.

Witnesses.

Inventor.

Joseph R. Pike

UNITED STATES PATENT OFFICE.

JOSEPH R. PIKE, OF JOHNSTON, PROVIDENCE COUNTY, RHODE ISLAND.

SINK-TRAP.

SPECIFICATION forming part of Letters Patent No. 354,930, dated December 28, 1886.

Application filed September 25, 1886. Serial No. 214,571. (No model.)

*To all whom it may concern:*

Be it known that I, JOSEPH R. PIKE, of Johnston township, in the county of Providence, in the State of Rhode Island, have invented a certain new and useful Improvement in Sink-Traps; and I do hereby declare the following to be a specification thereof, reference being had to the accompanying drawings.

Like letters indicate like parts.

Figure 1:
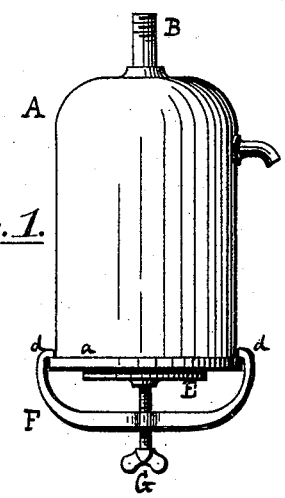
Figure 2:
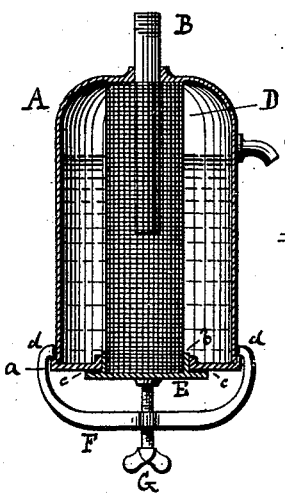
Figure 3:
Figure 4:
Figure 5:
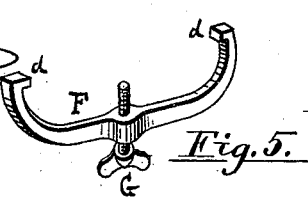

Figure 1 is a side elevation of my invention. Fig. 2 is a central vertical section of the same. Fig. 3 is a perspective view of the wire-gauze cage. Fig. 4 is a perspective view of the base-plate. Fig. 5 is a perspective view of the clamp.

My invention is an improved trap for the waste water of sinks; and it consists of a dome or tank for the water, proper inlet and outlet pipes, and a wire-gauze cage into which the inlet-pipe enters and which is supported by a detachable base, the whole being fastened together by a screw-clamp, as hereinafter specifically described.

In the drawings, A represents the dome or tank for the waste water. The bottom of this tank has a flange which projects slightly beyond the sides, as appears at $a$. The pipe B receives the water from the sink and discharges it into the tank. The pipe C carries the water from the tank into the sewer or drain pipe. A sheet of wire gauze or netting is bent into a tubular shape and forms the cage D, which extends centrally and vertically through the tank A from top to bottom. A base-plate, E, has a central annular lip or flange, $b$, into which the lower end of the gauze cage enters and rests.

Between the exterior bottom of the tank A and the plate E is a rubber or other packing ring, $c$. (Shown in Fig. 2.) A yoke or clamp, F, the ends of which are bent or lipped, as seen at $d$, serves to hold the parts together. A thumb-screw, G, passes through the center of the clamp F. The water-line is indicated at $x$ in Fig. 2.

The relative position of all the parts is fully shown in Fig. 2, and the whole is kept securely together by the screw G, which, passing through the clamp F, presses the plate E snugly against the packing $c$, while the lips $d$ of the clamp engage with the flange $a$ of the tank and draw the parts tightly together. By loosening the clamping-screw G the plate E and cage D are detached and may be removed.

The purpose of the gauze cage is to retain whatever solids or foreign substances pass from the sink with the waste water, but the fluid portion of the waste matter passes easily through the netting into the tank A and thence out of the discharge-pipe C. As the bottom of the pipe B is below the water line in the tank A, as seen in Fig. 2, a perfect trap is formed.

The parts are easily separated by loosening the screw, so that the cage may be removed whenever desired for the purpose of cleaning it or recovering anything which has passed from the sink through the pipe B.

I claim as a novel and useful invention, and desire to secure by Letters Patent—

The improved sink-trap herein described, consisting of the tank A, having a flanged bottom, the pipes B C, the plate E, having a ring or flange, $b$, the gauze cage D, the lipped clamp F, and screw G, substantially as specified.

JOSEPH R. PIKE.

Witnesses:
 DANIEL W. FINK,
 WARREN R. PERCE.